(12) United States Patent
Sanada

(10) Patent No.: US 7,040,720 B2
(45) Date of Patent: May 9, 2006

(54) HYDRAULIC CONTROL SYSTEM FOR VEHICLE

(75) Inventor: Satoshi Sanada, Chiryu (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/889,044

(22) Filed: Jul. 13, 2004

(65) Prior Publication Data

US 2005/0023893 A1    Feb. 3, 2005

(30) Foreign Application Priority Data

Jul. 30, 2003    (JP) .............................. 2003-282883

(51) Int. Cl.
*B60T 8/36* (2006.01)

(52) U.S. Cl. .................................................. 303/119.3
(58) Field of Classification Search ............. 303/119.3, 303/20
See application file for complete search history.

(56) References Cited

U.S. PATENT DOCUMENTS 6,354,674 B1 * 3/2002 Iwamoto et al. ......... 303/119.3
6,398,315 B1 * 6/2002 Dinkel et al. ............ 303/113.1
6,478,554 B1 * 11/2002 Dinkel et al. ............... 417/415

* cited by examiner

*Primary Examiner*—Devon C. Kramer
(74) *Attorney, Agent, or Firm*—Posz Law Group, PLC

(57) ABSTRACT

A solenoid cover includes a solenoid valve housing chamber housing solenoids of solenoid valves that project outwards from a hydraulic unit and a lower space therebelow. Two labyrinth portions with a fluid passage formed by a plurality of partition plates and communication holes are provided so as to be symmetrical with each other in a left-right direction below the lower space. An air vent communicates with the outside and which serves as a water drain is provided below each labyrinth portion. When a pressure in the solenoid valve housing chamber becomes negative due to a temperature decrease, water flows through the air vent at a high flow rate. Then, the water entering through the upper communication hole flows down along the partition plate toward the lower communication hole, which easily enables the water to be drained to the outside.

12 Claims, 4 Drawing Sheets

HYDRAULIC CONTROL SYSTEM FOR VEHICLE

CROSS REFERENCE TO RELATED APPLICATION

This application is based upon and claims the benefit of Japanese Patent Application No. 2003-282883 filed on Jul. 30, 2003, the content of which are incorporated herein by reference.

FIELD OF THE INVENTION

The present invention relates to a hydraulic control system for a vehicle.

BACKGROUND OF THE INVENTION

Conventionally, a vehicle has a hydraulic control system which includes a hydraulic unit for regulating a wheel cylinder pressure by actuating a solenoid valve, a pump motor which serves as an actuator for regulating a hydraulic pressure, an electronic control system which controls the hydraulic unit and drives the pump motor, and the like. In order to reduce the size of the hydraulic control system, the hydraulic unit, the pump motor and the electronic control system are integrated into a module.

In a hydraulic control system like this, it is particularly important that a solenoid portion of the solenoid valve is not exposed to water and dust in order to prevent a breakdown or corrosion. To achieve this objective, the solenoid portion could be disposed in an air-tight chamber. However, when an in-vehicle air-tight chamber is subjected to a severe temperature change, water vapor is likely to enter the air-tight chamber and dew is likely to condense therein.

In order to address this problem, a solenoid valve housing chamber for housing a solenoid portion of the solenoid valve usually includes an air vent. The air vent allows water to enter a solenoid valve housing chamber and facilitates draining of the water that has entered (for example, as disclosed in Japanese Patent Application Laid-Open 2001-124005).

There are some cases where water entry into the solenoid valve housing chamber having an air vent like this occurs because the air vent is immersed in water, whereby water pressure is applied to the air vent. Another reason for water entry is as follows. When the temperature of the solenoid valve housing chamber installed in an engine room is relatively high in accordance with an actuation state of the solenoid valve, and if a case in which the solenoid valve housing chamber gets wet due to water on a road surface being splashed thereof, the temperature in the solenoid valve housing chamber drops. When the pressure in the solenoid valve housing chamber becomes negative due to a sudden temperature change like this, water which has splashed onto the case in the vicinity of the air vent is sucked into the solenoid housing chamber by the negative pressure, whereby water enters the solenoid valve housing chamber.

In the above described conventional art, an air passage that is repeatedly bonded to form a labyrinth structure formed is used to communicate the solenoid valve housing chamber with the outside, via the housing and a pump case. However, manufacturing of the air passage requires an additional processing for the housing and a structural change in a motor portion, whereby cost is increased.

SUMMARY OF THE INVENTION

It is an object of the present invention to provide a hydraulic control system, with a simple configuration, that can prevent water entry to a solenoid valve housing chamber, and, even in the case that water entry occurs, can allow the water to be quickly drained.

A first aspect of the present invention includes a labyrinth portion provided between a lower space formed below a solenoid valve position region in a solenoid valve housing chamber and an air vent formed at a lowermost portion of the solenoid valve housing chamber. The labyrinth portion includes partition plates for inhibiting fluid flow and communication holes formed in respective parts of the partition plates.

Therefore, the labyrinth portion is capable of inhibiting as well as allowing water entry through the air vent. The labyrinth portion with this configurations may be formed as a part of the lower space, and thus may be formed integrally and simultaneously with a casing of the solenoid valve housing portion. Therefore, it is possible to easily manufacture the hydraulic control system without requiring design changes to be made, for example, the structure of the hydraulic unit or the installation position of the solenoid valve.

According to a second aspect of the present invention, even when fluid, namely water, enters the lower space through an upper communication hole or a lower communication hole of the first partition plate, the water flows down from the upper communication hole to the lower communication hole along the first partition plate which is inclined. Thus, the water is easily drained through the lower communication hole toward the air vent which is positioned below. Accordingly, the first partition plate and the lower communication hole are capable of functioning as a drain passage for the lower space, and water is prevented from remaining on the first partition plate.

Note that an up-down direction of the solenoid valve housing chamber may be the same as an up-down direction of the hydraulic control system when mounted in the vehicle. Moreover, the lowermost portion of the solenoid valve housing chamber and the lower portion of the lower space may also be the same as a lower portion in the up-down direction of the hydraulic control system when mounted in the vehicle.

According to a third aspect of the present invention, a second partition plate is disposed above the air vent provided at the lowermost portion of the solenoid valve housing chamber. The first partition plate is disposed above the second partition plate, and further, the lower space is formed above the first partition plate. Therefore, the fluid, which is the water in this case, which flows upward through the air vent first strikes the second partition plate, whereby direct water entry into the lower space is inhibited. Further, on some occasions, water may enter the lower space through the communication hole of the second partition plate enters the lower space through the upper communication hole or the lower communication hole of the first partition plate. Even in this case, the water flows from the upper communication hole to the lower communication hole along the first partition plate which is inclined, and is easily drained through the lower communication hole to the second partition plate disposed below. Then, the water can be drained to the outside of the solenoid valve housing chamber through the communication hole to the air vent disposed below.

Accordingly, water is less likely to enter the solenoid valve housing chamber, and water that enters the solenoid valve housing chamber can be easily drained.

Further, according to a fourth aspect of the present invention, even when fluid entry occurs through the air vent, the fluid can be guided to a communication hole for inflow that has a larger opening area than a communication hole for discharge. Moreover, while the thus guided fluid enters the upper communication hole which is disposed at a comparatively high position, the momentum of the fluid can be attenuated. Therefore, it is possible to easily inhibit the fluid from entering the lower space.

Note that, in the solenoid valve housing chamber, a pump-motor electric supply terminal is disposed above the lower communication hole of the first partition plate in the up-down direction. Accordingly, fluid is easily drained through the lower communication hole, and the pump-motor electric supply terminal (through which a relatively large current passes) is less likely to be immersed in fluid.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
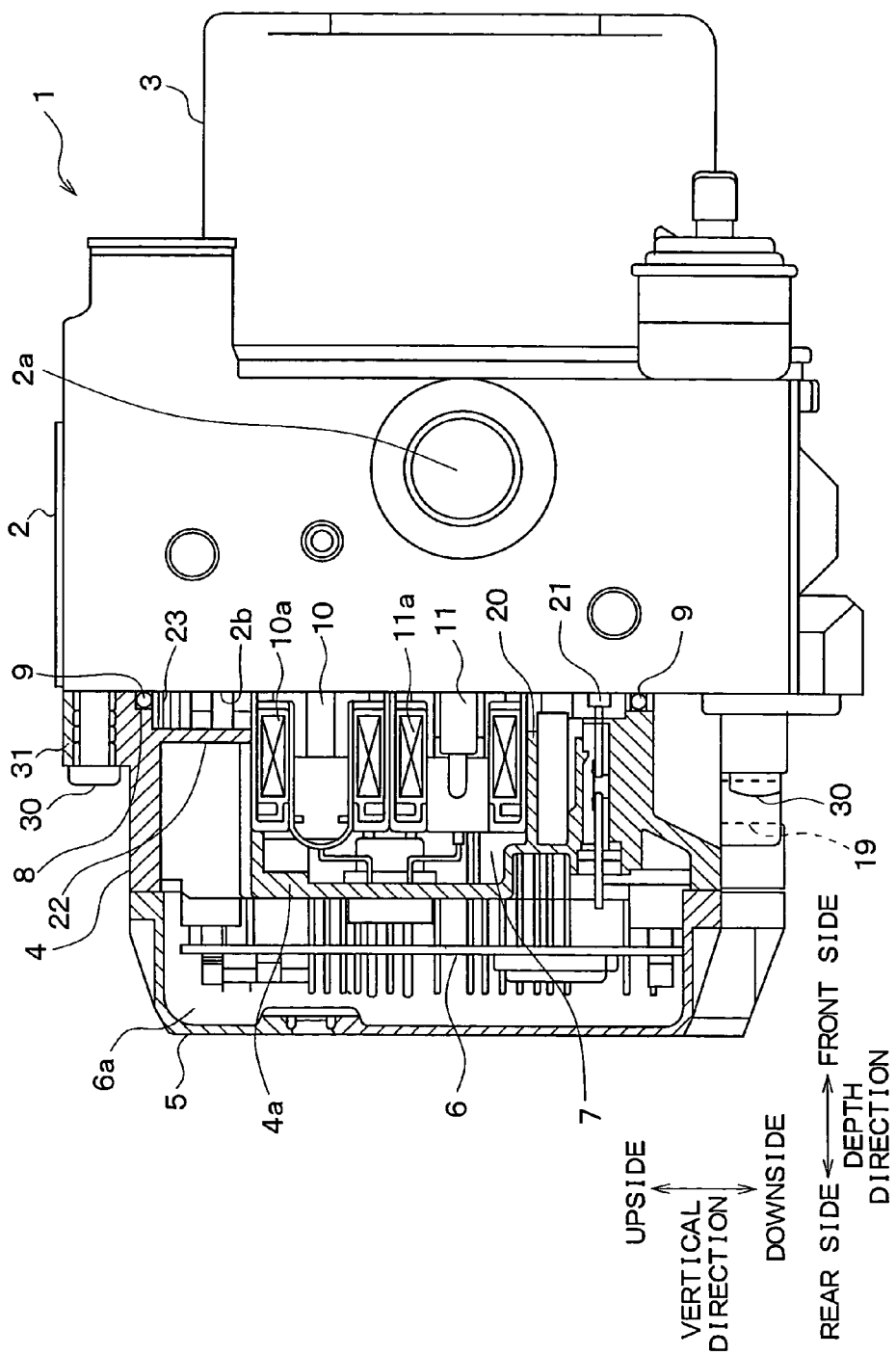
FIG. 1 is a front view of a hydraulic control system according to an embodiment of the invention.

The present invention will be described further with reference to various embodiments in the drawings.

Figure 2:
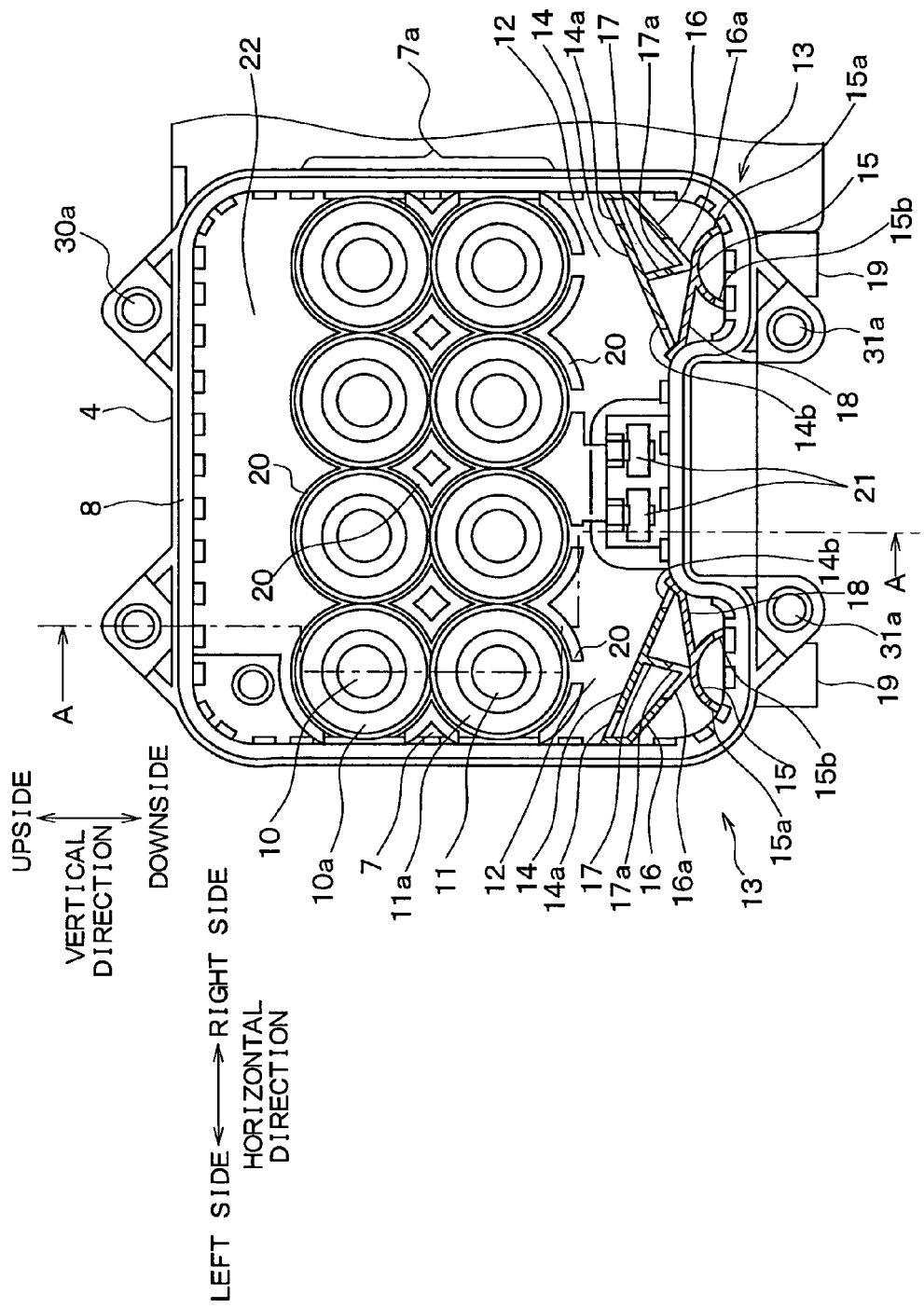
FIG. 2 is a side view of a solenoid cover viewed from a left side of FIG. 1.
Figure 3:
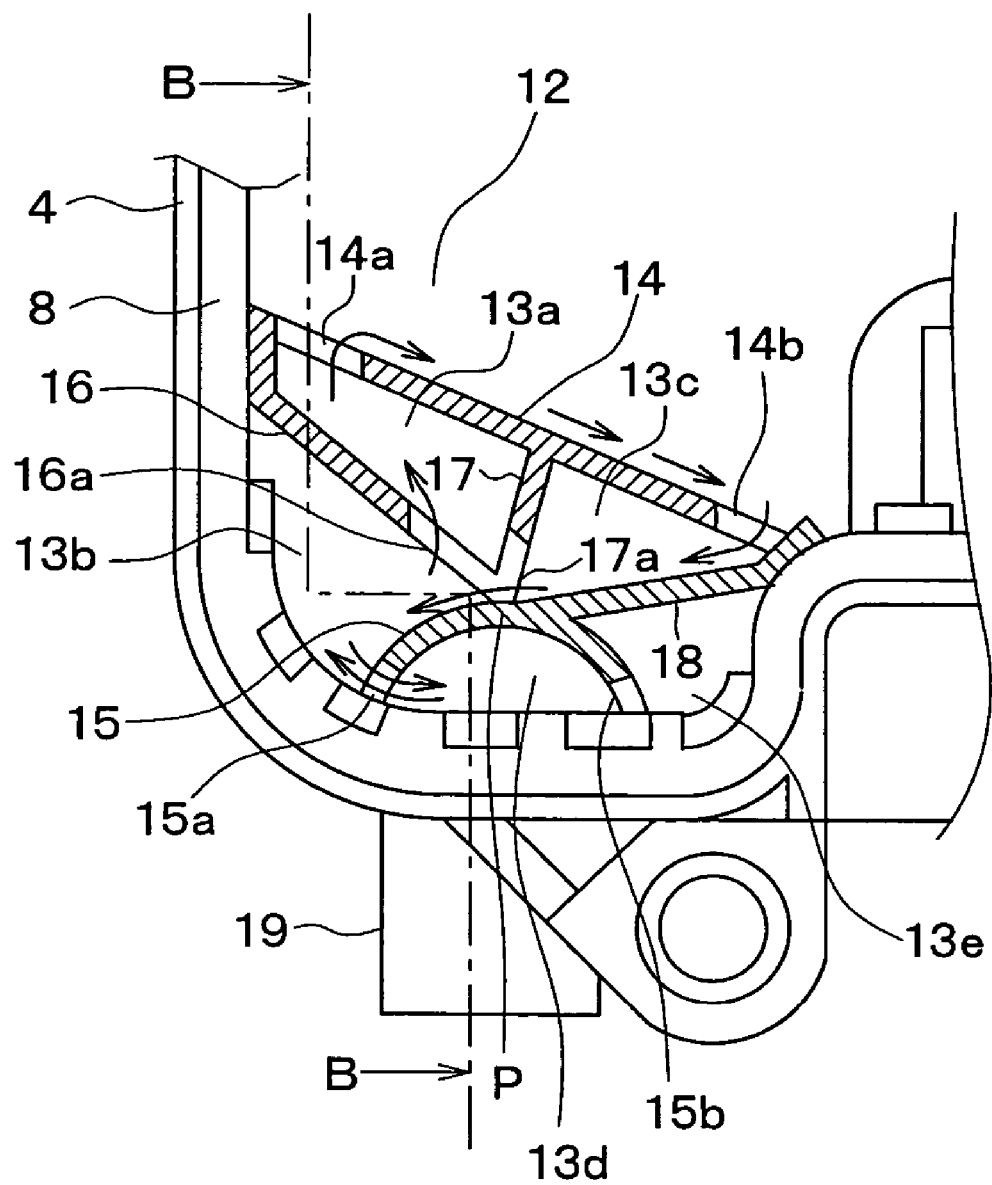
FIG. 3 is an enlarged view of a left labyrinth portion of FIG. 2.
Figure 4:
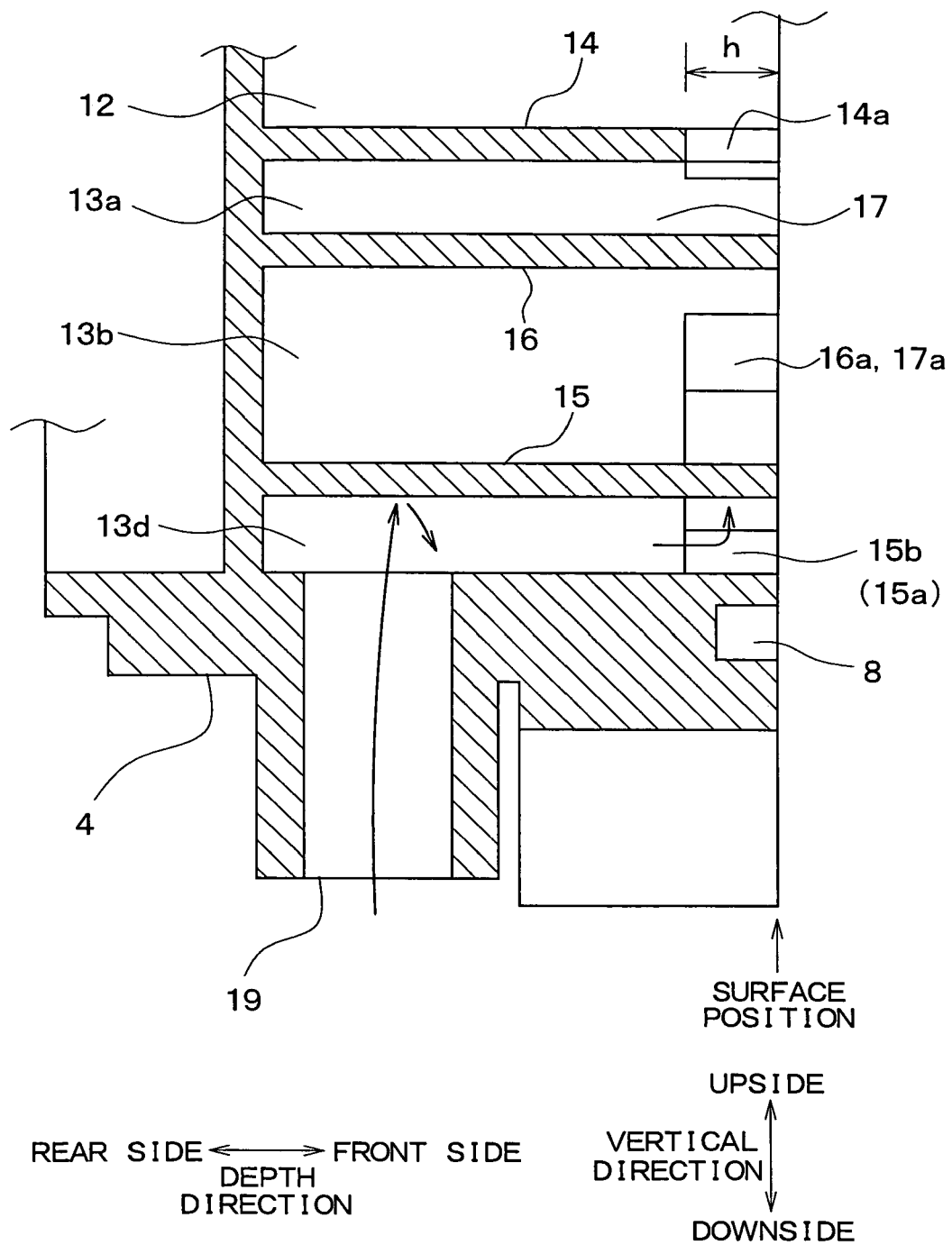
FIG. 4 is a sectional view taken along line B—B of FIG. 3.

A hydraulic control system for a vehicle according to an embodiment of the present invention will be explained in detail referring to the drawings. FIG. 1 is a front view of a hydraulic control system 1 (including a partial sectional view cut along line A—A in FIG. 2); FIG. 2 is a side view of a solenoid cover 4 viewed from a left side of FIG. 1; FIG. 3 is an enlarged view of a left labyrinth portion 13 in FIG. 2; and FIG. 4 is a sectional view of the labyrinth portion 13 taken along line B—B as shown in FIG. 3. Respective top sides of the drawings in FIGS. 1 to 4 indicates an upside in the vertical direction when the hydraulic control system 1 is mounted in a vehicle body (hereinafter also simply referred to as "above" or "upside"). Furthermore, in FIGS. 1 and 4, a left side and a right side of the drawing are defined as a rear side and a front side in the depth direction (hereinafter also simply referred to as "a rear side" and "a front side", respectively). In FIGS. 2 and 3, a left side and a right side of the respective drawings are defined as the left side and the right side in the horizontal direction (hereinafter also be simply referred to "a left side" and "a right side", respectively). Note that FIG. 2 shows a configuration in which solenoids 10a and 11a are provided.

The hydraulic control system 1 according to the present embodiment is used, for example, to execute a vehicle control such as an anti-skid control, and is an integrated module including a hydraulic unit housing 2, a pump motor 3, a solenoid cover 4 and a circuit board cover 5. The hydraulic unit housing 2 houses a hydraulic mechanism which includes (i) a hydraulic pump 2a for regulating a hydraulic pressure or the like and (ii) solenoid valves 10 and 11 and the like. Further, the pump motor 3 drives the hydraulic pump 2a, and the solenoid cover 4 houses a portion around solenoids 10a and 11a. The circuit board cover 5 covers an electronic circuit board 6 for controlling the solenoid valves 10 and 11 as well as the pump motor 3. Note that the hydraulic unit housing 2 and the pump motor 3 are made of metal, and the solenoid cover 4 and the circuit board cover 5 are resin mold products.

One side of the solenoid cover 4 (on the rear side in the depth direction in FIG. 1) is covered with the circuit board cover 5 which is welded thereto. The solenoid cover 4 includes a partition 4a (a hatched portion in FIG. 1) running in the vertical direction. The electronic circuit board 6 is housed in a board housing chamber 6a which is surrounded in an air-tight manner by the partition 4a and the circuit board cover 5. Note that the partition 4a is provided with connectors (not shown) for supplying electricity from the electronic circuit board 6 to the pump motor 3 and the solenoid valves 10 and 11. The connectors are kept air-tight by filling a sealing agent therearound.

The solenoid cover 4 is connected to an opening 2b of the hydraulic unit housing 2 with screws 30 and 31, through packing 9 for air-tight purpose which fills a packing groove 8 provided in an outer peripheral portion of the solenoid cover 4. A space between the partition 4a of the solenoid cover 4 and the opening 2b of the hydraulic unit housing 2 serves as a solenoid valve housing chamber 7, and is kept air-tight, with the exception of a portion of air vents 19 which will be described later.

Four sets (four each in upper and lower lines) of the solenoid valves 10 and 11 serving as the hydraulic mechanism are aligned so that the eight solenoids 10a and 11a portions thereof are projected in the opening 2b of the hydraulic unit housing 2. The solenoids 10a and 11a are housed in a solenoid valve position region 7a which is close to a center of the solenoid valve housing chamber 7. The respective solenoids 10a and 11a are electrically connected to the electronic circuit board 6 through the partition 4a. A plurality of sleeve members 20 with a partially cylindrical shape are provided in the partition 4a so as to project toward the front in the depth direction. Each of the solenoids 10a and 11a is housed such that a periphery thereof is surrounded by the sleeve member 20, which enables the solenoids 10a and 11a to be easily positioned when assembly takes place.

Moreover, the partition 4a which is above the solenoids 10a and 11a and the like has an upper volume reduced portion 22 that is positioned such that there is a reduced distance between the partition 4a and the hydraulic unit housing 2. Moreover, a side of the upper volume reduced portion 22 that contacts the solenoid 10a is formed into a cylindrical shape so as to be adjacent to the outer peripheral portion of the solenoid 10a. With the above described configuration, a volume of an upper space 23 which is formed between the upper volume reduced portion 22, the opening 2b of the hydraulic unit housing 2 and the four horizontally-aligned solenoids 10a is made as small as possible.

On the other hand, a lower space 12 is provided below the solenoid valve position region 7a, and, more specifically, between the four horizontally-aligned solenoids 11a and an outer wall of the solenoid cover 4. The lower space 12 is formed between the partition 4a and the hydraulic unit housing 2. Further, two labyrinth portions 13 are provided below the lower space 12 so as to be symmetrical with each other in the left-right direction as shown in FIG. 2. Respective air vents 19 which communicate with the outer wall and which serve as water drains are provided below each of the labyrinth portions 13.

In the lower space 12, a pair of electric supply terminals 21 for a pump motor (hereinafter referred to as pump-motor electric supply terminals 21) project from the partition 4a toward the front in the depth direction in a portion between the two labyrinth portions 13. The position of the pump-motor electric supply terminal 21 in the up-down direction is higher than that of a lower communication hole 14b provided in a first partition plate 14, to be described later, of each labyrinth portion 13.

Hereinafter an explanation will be given about the labyrinth portion 13 on the left side in FIG. 2, referring to FIGS. 3 and 4. Note that since the labyrinth portion 13 on the right side is symmetrical with the labyrinth portion 13 on the left side, the same structures will be denoted by the same reference numbers and the explanation thereof will be omitted.

The labyrinth portion 13 is configured by first to fifth partition plates 14 to 18. The first to fifth partition plates 14 to 18 are so as to project from the partition 4a toward the front in the depth direction so as to contact the hydraulic unit housing 2 through the partition 4a. Note that, in FIG. 3, portions at which the partition plates 14 to 18 contact the hydraulic unit housing 2 are hatched. Further, a position in FIG. 4 at which each of the partition plates 14 to 18 contacts the hydraulic unit housing 2 will be referred to herein as a surface position of the solenoid cover 4 (hereinafter, simply referred to as a "surface position").

The first partition plate 14, formed as a flat plate, is positioned farthest (among the partition plates 14 to 18) from the air vent 19 in the vertical direction, that is, the first partition plate 14 is positioned so as to contact the lower space 12 and inclined with respect to the horizontal direction. An upper communication hole 14a is provided in an inclined upper portion of the first partition plate 14. The upper communication hole 14a is cut into a rectangular shape with a predetermined width and a height h, which is the height from the surface position to the rear in the depth direction. Note that all other communication holes mentioned in this specification hereunder, are also formed with a rectangular shape.

Also, a lower communication hole 14b is provided in an inclined lower portion of the first partition plate 14. The lower communication hole 14b is cut into a rectangular shape with a predetermined width and a height h, which is the height from the surface position to the rear in the depth direction. Accordingly, the upper side of the first partition plate 14 functions as a drainage path by which water that has entered the lower space 12 through the upper communication hole 14a flows down to the lower communication hole 14b.

The second partition plate 15 is configured by a semi-cylindrical plate extending in the depth direction and is adjacent to the air vent 19. Two communication holes 15a and 15b are provided at respective semi-cylindrical ends of the second partition plate 15. Each of the communication holes 15a and 15b is cut into a rectangular shape with a predetermined width and a height h, which is the height from the surface position to the rear in the depth direction. Note that the air vent 19 is positioned rearward in the depth direction of the surface position of the solenoid cover 4. On some occasions water may flood into, that is, flow in a high flow rate, because, for example, the pressure in the solenoid valve housing chamber 7 becomes negative. However, even in this case, water unavoidably strikes a semi-cylindrical inner face of the second partition plate 15 as shown by an arrow in FIG. 4. Then, the water reaches the communication holes 15a and 15b after the momentum of the water has been reduced. Therefore, the water is inhibited from reaching the communication holes 15a and 15b directly through the air vent 19. Furthermore, since the momentum of the water is reduced, water entry toward the lower space 12 through the second partition plate 15 is inhibited.

The first partition plate 14 is connected-to the second partition plate 15 through the third to fifth partition plates 16 to 18. The third partition 16, configured by a flat plate, is disposed so as to connect between the vicinity of the upper communication hole 14a of the first partition plate 14 and a semi-circular top P of the second partition plate 15 in the vertical direction. Moreover, a communication hole 16a is provided below the third partition plate 16 in the vertical direction, that is, in the vicinity of the semi-circular top P of the second partition plate 15. The communication hole 16a is cut by a height h, which is the height from the surface position to the rear in the depth direction for a predetermined width.

The fourth partition plate 17, configured by a flat plate, is disposed so as to connect a substantially central portion of the first partition plate 14 in the vertical plane and the semi-circular top P of the second partition plate 15. Moreover, a communication hole 17a is provided vertically below the fourth partition plate 17, that is, in the vicinity of the semi-circular top P of the second partition plate 15, so as to be continuous with the communication hole 16a of the third partition plate 16. The communication hole 17a is cut into a rectangular shape, by an amount corresponding to a height h, to the rear in the depth direction from the surface position for a predetermined width.

Note that the width of cut-out portion of the communication hole 16a is larger than that of the cut-out portion of the communication hole 17 in the vertical plane. That is, the communication hole 16a has a larger opening area than the communication hole 17a.

The fifth partition plate 18, configured by a flat plate, is disposed so as to connect the vicinity of the lower communication hole 14b of the first partition plate 14 and the semi-circular top P of the second partition plate 15 in the vertical plane. Note that a communication hole is not formed in the fifth partition 18.

In the labyrinth portion 13, five segmented regions 13a, 13b, 13c, 13d and 13e that are communicated with each other are defined by the first to fifth partition plates 14 to 18 disposed as described above and the outer wall of the solenoid cover 4. More specifically, the segmented region 13a is defined by the first partition plate 14, the third partition plate 16 and the fourth partition plate 17. The segmented region 13b is defined by the second partition plate 14, the third partition plate 16 and the outer wall of the solenoid cover 4. The segmented region 13c is formed by the first partition plate 14 and the fifth partition plate 18. The segmented region 13d is formed by the second partition plate 15 and the outer wall of the solenoid cover 4. Lastly, the segmented region 13e is defined by the second partition plate 15, the fifth partition plate 18, and the outer wall of the solenoid cover 4.

Further, the segmented region 13a communicates respectively, with the lower space 12 through the upper communication hole 14a; with the segmented region 13b through the communication hole 16a; and the segmented region 13c through the communication hole 17a. The segmented region 13b communicates respectively with the segmented region 13a through the communication hole 16a; with the segmented region 13d through the communication hole 15a; and the segmented region 13c through the communication hole 17a. Further, the segmented region 13c communicates respectively with the lower space 12 through the lower communication hole 14b, and with the segmented region 13a and the segmented region 13b through the communication hole 17a. Further, the segmented region 13d communicates respectively with the segmented region 13b through the communication hole 15a and the segmented region 13e through the communication hole 15b. Note that the segmented region 13e only communicates with the segmented region 13d through the communication hole 15b.

The labyrinth portions 13 provided with the partition plates 14 to 18 and the communication holes 14a to 17a can be formed at the same time as the upper volume reduced portion 22 as a part of the solenoid cover 4. Furthermore, the labyrinth portion 13 is provided below the lower space 12, which enables both design flexibility and simplicity. Note that the labyrinth portion 13 may be regarded as a portion of the lower space 12.

Water flows in the labyrinth portion 13 with the above described configuration as follows. When water enters the segmented region 13d through the air vent 19, the water enters the segmented region 13b through the communication hole 15a. Note that the communication. region 13e only communicates with the communication hole 15b, so few water enters the communication region 13e.

On some occasions, the momentum, that is, the flow rate, of the entering water that enters the segmented region 13d through the air vent 19 may be large. In this case, the entering water strikes the cylindrical inner surface of the first partition plate 15, and bounces back in the reverse direction toward the air vent 19. Further, in the segmented region 13d, the direction in which the water strikes the cylindrical inner surface and in which the water flows through the air vent 19 is almost at right angles to the direction in which the water flows from the air vent 19 to the communication hole 15a. Accordingly, the momentum of the water is effectively reduced. Then, the water passes through the segmented region 13d, the communication hole 15a, the segmented region 13b, the communication hole 16a, the segmented region 13a, the upper communication hole 14a. Finally, the water enters the lower space 12.

Since the communication hole 16a has a larger opening area than the communication hole 17a, the water in the segmented region 13b mainly enters the segmented region 13a through the communication hole 16a. That is, the communication hole 16a functions as a communication hole for inflow. Furthermore, on occasions, the water may enter the segmented region 13b through the communication hole 15a with large momentum. Even in this case, however, since the third partition plate 16 is provided in the direction where the water flows, the entering water strikes the third partition 16 and the momentum of the water is reduced. Therefore, water is inhibited from directly reaching the upper communication hole 14a. Accordingly, water entry through the upper communication hole 14a to the lower space 12 is inhibited.

Then, the water which enters the lower space 12 flows down the surface of the first partition plate 14 from the upper communication hole 14a to the lower communication hole 14b. The water passes through the lower communication hole 14b, the segmented region 13c, the communization hole 17a, the segmented region 13b, the communication hole 15a, the segmented region 13d and the air vent 19. Accordingly, the water is drained outside of the solenoid cover 4. As described above, the communication hole 17a serves as a communication hole for drainage.

Since the labyrinth portion 13 is configured as described above, the second partition plate 15 inhibits water entry through the air vent 19. Further, the inclined configuration of the first partition plate 14 enables the water which enters the lower space 12 to be quickly drained through the lower communication hole 14b.

Accordingly, it is difficult for water to enter the lower space 12 of the solenoid cover 4. Furthermore, even if the water enters the lower space 12, the water can be quickly drained to the outside.

Furthermore, in the lower space 12, the pump-motor electric supply terminal 21 is positioned above the lower communication hole 14b of the partition plate 14 in the vertical direction. Therefore, it is possible to inhibit the pump-motor electric supply terminal 21 through which a relatively large current passes from being immersed in the water, since the water that enters the lower space 12 is quickly drained out through the lower communication hole 14b. Accordingly, reliability of the hydraulic control system 1 is improved.

Note that when the air vent 19 is immersed in water, and the water level gradually increases, the flow rate of the water which flows in through the air vent 19 is low. In this case, the water level inside the labyrinth portion 13 gradually rises at a rate that is equal for all of the segmented regions 13a, 13b and 13c. Further, the water enters the lower space 12 through the lower communication hole 14b. Meanwhile, when the water level decreases, the water is quickly drained through the lower communication hole 14b. Accordingly, it is possible to keep the water level in the lower space 12 to as low a level as possible.

While the above description is of the preferred embodiments of the present invention, it should be appreciated that the invention may be modified, altered, or varied without deviating from the scope and fair meaning of the following claims.

What is claimed is:

1. A hydraulic control system for a vehicle, comprising:
a hydraulic unit housing which houses a hydraulic mechanism including a pump motor for regulating a hydraulic pressure for a vehicle control and a plurality of solenoid valves; and
a solenoid cover which is attached to the hydraulic unit housing so as to cover an opening that is formed at one end of the hydraulic unit housing, wherein
the solenoid valves are housed in a solenoid valve position region in a solenoid valve housing chamber formed by the opening and the solenoid cover, and
in the solenoid valve housing chamber,
an air vent which communicates the solenoid valve housing chamber with an outside thereof is formed at a lowermost portion,
a lower space with a predetermined volume is formed between the solenoid valve position region and the air vent,
a labyrinth portion is formed between the air vent and the lower space, the labyrinth portion including at least one partition plate that inhibits flow of a fluid between the air vent and the lower space, and
the labyrinth portion includes a partition plate which is inclined with respect to an up-down direction of the solenoid valve housing chamber, and a lower communication hole at a lower portion thereof to allow the flow of the fluid.

2. The hydraulic control system for a vehicle according to claim 1, wherein
the partition plate includes a first partition plate which separates the lower portion and the air vent and which is inclined with respect to an up-down direction of the solenoid valve housing chamber, the first partition plate having an upper communication hole at an upper portion thereof in addition to the lower communication hole.

3. The hydraulic control system for a vehicle according to claim 2, wherein
the partition plate includes a second partition plate which is disposed below the first partition plate, and which is disposed in the vicinity of the air vent such that fluid that flows through the air vent strikes the second partition plate, the second partition plate including a communication hole and being formed such that fluid that flows through the air vent flows through the communication hole toward the upper communication hole of the first partition plate.

4. The hydraulic control system for a vehicle according to claim 2, wherein the labyrinth portion further comprises a communication hole for inflow which is disposed in a portion between the air vent and the upper communication hole and a communication hole for discharge which is disposed in a portion between the lower communication hole and the air vent, the communication hole for inflow having a larger opening area than the communication hole for discharge.

5. The hydraulic control system for a vehicle according to claim 2, wherein a pump-motor electric supply terminal is disposed in the lower space in the solenoid valve housing chamber, so as to be positioned above the lower communication hole of the first partition plate in the up-down direction.

6. The hydraulic control system for a vehicle according to claim 3, wherein a pump-motor electric supply terminal is disposed in the lower space in the solenoid valve housing chamber, so as to be positioned above the lower communication hole of the first partition plate in the up-down direction.

7. The hydraulic control system for a vehicle according to claim 4, wherein a pump-motor electric supply terminal is disposed in the lower space in the solenoid valve housing chamber, so as to be positioned above the lower communication hole of the first partition plate in the up-down direction.

8. A solenoid valve housing chamber formed by a vehicle hydraulic control system hydraulic unit housing and a solenoid cover for covering an opening that is formed at one end of the vehicle hydraulic control system hydraulic unit housing, the solenoid valve housing chamber comprising:
an air vent formed at a lowermost chamber portion and that communicates the solenoid valve housing chamber with an outside thereof;
a labyrinth portion formed above the air vent and including a partition plate that is inclined with respect to an up-down direction of the solenoid valve housing chamber and that inhibits fluid flow between the air vent and chamber portions above the labyrinth portion, and a lower communication hole formed in a lower portion of the partition plate so as to allow the fluid flow.

9. The solenoid valve housing chamber according to claim 8, wherein the partition plate includes a first partition plate that separates the chamber portions above the labyrinth portion and the air vent and that is inclined with respect to an up-down chamber direction, the first partition plate having an upper communication hole at an upper portion thereof as well as the lower communication hole.

10. The solenoid valve housing chamber according to claim 9, wherein the partition plate includes a second partition plate that is disposed below the first partition plate, and that is disposed in the vicinity of the air vent such that fluid that flows through the air vent strikes the second partition plate, the second partition plate including a communication hole and being formed such that fluid that flows through the air vent flows through the communication hole toward the upper communication hole of the first partition plate.

11. The solenoid valve housing chamber according to claim 9, wherein the labyrinth portion further comprises a communication hole for inflow that is disposed in a portion between the air vent and the upper communication hole and a communication hole for discharge that is disposed in a portion between the lower communication hole and the air vent, the communication hole for inflow having a larger opening area than the communication hole for discharge.

12. A labyrinth portion of a vehicle hydraulic control system solenoid valve housing chamber, comprising:
an inclined first partition plate that separates a housing chamber lower portion and a bottom chamber air vent and that includes an upper communication hole and a lower communication hole at respective upper and lower portions thereof; and
a second partition plate that is disposed below the first partition plate, and that is disposed in a vicinity of the bottom chamber air vent such that fluid that flows through the bottom chamber air vent strikes the second partition plate, the second partition plate including a second partition plate communication hole formed such that fluid that flows through the bottom chamber air vent flows through the second partition plate communication hole toward the upper communication hole of the first partition plate.

* * * * *